United States Patent [19]

Chivilo' et al.

[11] 4,312,310
[45] Jan. 26, 1982

[54] POLLUTION-PREVENTING AND DRIVING DEVICE FOR INTERNAL COMBUSTION ENGINES

[75] Inventors: Fausto Chivilo', Barlassina; Francesco Sezzi, San Donato Milanese, both of Italy

[73] Assignee: Snamprogetti, S.p.A., Milan, Italy

[21] Appl. No.: 30,926

[22] Filed: Apr. 17, 1979

[30] Foreign Application Priority Data

Apr. 24, 1978 [IT] Italy .................. 22646 A/78
Apr. 24, 1978 [IT] Italy .................. 22647 A/78

[51] Int. Cl.³ .............................. F02D 9/00
[52] U.S. Cl. ................ 123/198 DB; 123/198 D; 123/325; 123/339
[58] Field of Search ........ 123/198 DB, 198 D, 198 F, 123/1 R, 325, 332, 339, 346, 349; 74/857, 860, 864

[56] References Cited

U.S. PATENT DOCUMENTS

| | | | |
|---|---|---|---|
| 3,338,111 | 8/1967 | Walker | 123/339 |
| 3,517,653 | 6/1970 | Ariga et al. | 123/198 DB |
| 3,626,912 | 12/1971 | Grosclaude | 123/325 |
| 3,683,869 | 8/1972 | Kamazuka et al. | 123/325 |
| 3,707,892 | 1/1973 | Kuroda et al. | 74/860 |
| 3,795,237 | 3/1974 | Denton | 123/325 |
| 4,022,164 | 5/1977 | Fuchs | 123/1 R |
| 4,083,267 | 4/1978 | Raaz | 74/860 |
| 4,150,654 | 4/1979 | Heitzman et al. | 123/198 D |

FOREIGN PATENT DOCUMENTS 1185644 3/1970 United Kingdom ............... 123/325

*Primary Examiner*—P. S. Lall
*Attorney, Agent, or Firm*—Morgan, Finnegan, Pine, Foley & Lee

[57] ABSTRACT

A device is disclosed, which is intended for reducing the fuel consumption and the environmental pollution. An auxiliary power unit is provided, which is energized when a sensing mechanism signals to a signal-processing and control circuit that the engine is idling, for example, at a traffic light stop, or that a deceleration of the vehicle occurs. The fuel intake is cut off and a timing system provides to exclude the fuel feed to the engine for a certain selectable time. When such conditions are sensed, the auxiliary power unit (hydraulic or electric) provides to have the engine running without fuel use up. As normal traffic conditions are resumed, fuel is readmitted and the usual operation is started once again.

7 Claims, 3 Drawing Figures

POLLUTION-PREVENTING AND DRIVING DEVICE FOR INTERNAL COMBUSTION ENGINES

This invention relates to a device adapted to drive an internal combustion engine, of the controlled-ignition, or the spontaneous-ignition type in the areas in which the town traffic is of the stop-and-go type.

It is known that a considerable fraction of the fuel use up and of the emission of exhaust gases can be attributed to the "stop-and-go" pace as imposed by the town traffic.

No means are known, as far as Applicant's knowledge can reach which are adapted to reduce such a use up and such emissions.

The device of this invention permits an energy recovery which is such as to permit the running of the engine for a limited time during a stop of the car, without feeding of fuel and to facilitate the subsequent pickup.

The hydraulic and pneumatic device of this invention permits to minimize the consumption of fuel and the noxious emissions in the stop-and-go runs, without any manipulation by the driver, with the exception of the usual ones.

The device according to this invention will now be illustrated by the accompanying drawings which show a few embodiments of the invention.

Figure 1:
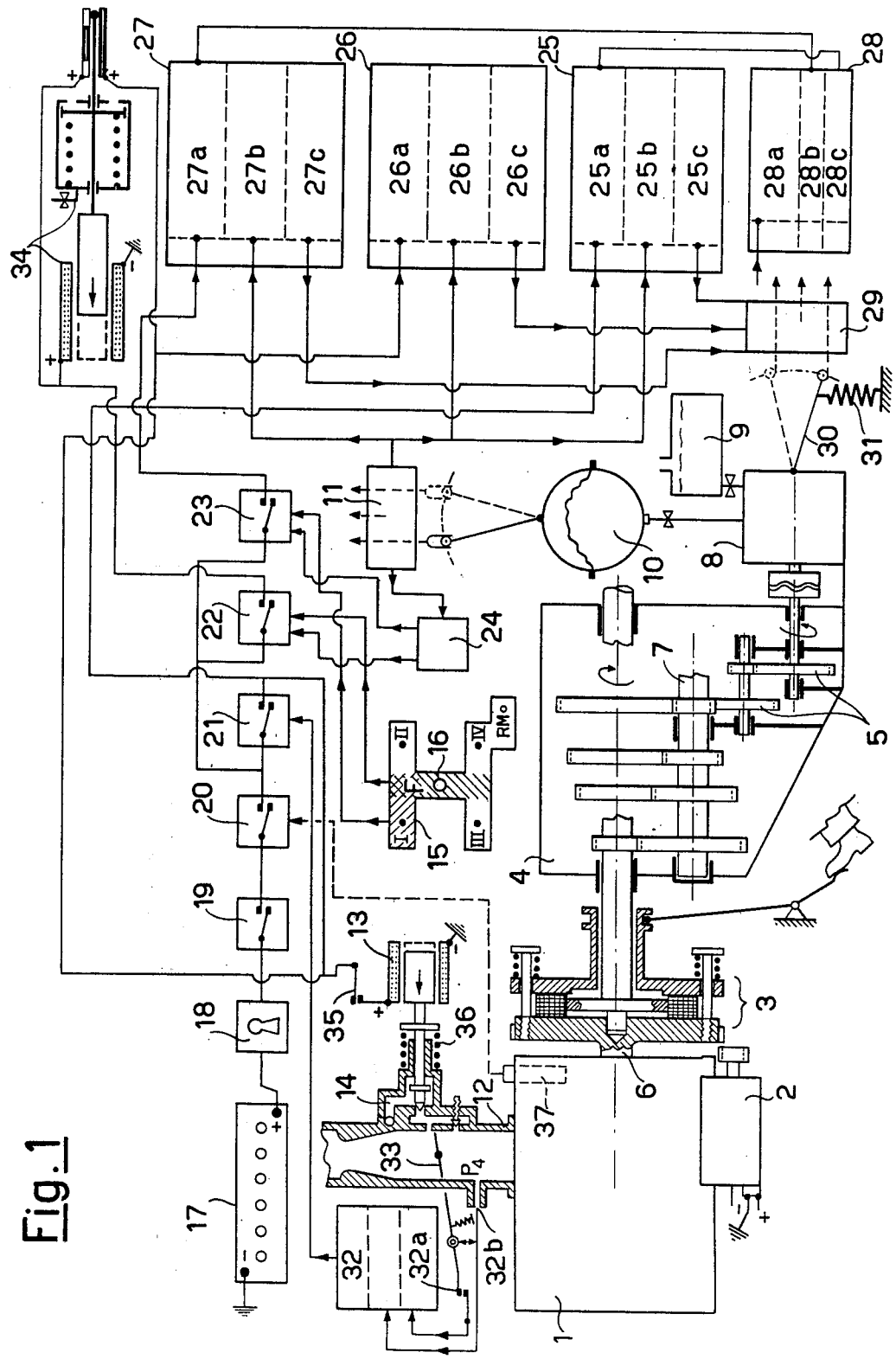
FIG. 1 shows the general layout of the hydraulic and pneumatic device according to this invention.

In FIG. 1, the reference numeral 1 indicates the internal combustion engine, 2 the starter (conventional), 3 the flywheel and clutch unit, 4 the gearbox, 5 the auxiliary systems of drive transfer to the mainshaft 6 via the secondary shaft 7, 8 is the hydraulic and pneumatic motive pump having a variable rate of flow, 9 is the oil reservoir, 10 the pressure accumulator with its attendant pressure indicator 11: The reference numeral 12 indicates the carburettor, 13 the electromagnetic valve with a return spring 36 for cutting off the fuel flow in the idling channel 14. The reference numeral 15 indicates symbolically the several positions taken by the gear shift lever 16. The reference numeral 17 indicates the conventional storage battery, 18 is the starting switch, 19 is the main switch of the device according to the invention, 20 is the consent switch for the attainment of the thermal steady conditions of the engine 1, 21 the consent switch for the release of the accelerator pedal, 22 is the consent switch for the neutral position of the shift lever, 23 is the consent switch for the car under pickup conditions of the engine and 24 is the consent switch for the attainment of the preselected pressure, 25 indicates a rate of flow adjusting device for the hydraulic and pneumatic pump 8, 25a the input of the consent of accelerator pedal release, 25b is the input of the pressure signal coming from 11, and 25c is the output for regulating the rate of flow of the pump 8, 26 indicates an assembly which adjusts the driving motion for the engine 1 via the pump 8, 26a is the input of the consent for the car with the gearbox in the neutral position, 26b is the input of the pressure signal and 26c is the output of the rate of flow adjustment unit for the pump 8, 27 is an assembly which regulates the power dispensed by the engine 8 as an auxiliary means for the engine 1, 27a is the input of the consent for the car in engine pickup conditions, 27b is the input of the pressure signal coming from 11 and 27c is a rate of flow adjusting device for 8, 28 is the auxiliary unity for emergency action when an abrupt braking action is made during the acceleration stage immediately after engine pickup, 28a indicates the consent input for the conventional brake system, 28b is the cut off of the unit 27, 28c is the control output for actuating the unit 25, 29 is a servocontrol for the actuation of the lever 30 for the rate of flow of the motive hydraulic and pneumatic pump 8.

The reference numeral 31 indicates a recoil spring for the no flow condition, 32 is a sensor of the condition of deceleration of the car and release of the accelerator pedal, 32a is the contact for the butterfly 33 in the idling position and 32b is the probe for negative pressure downstream of 33. 34 indicates a timer and 35 a manual switch for cutting off 13.

The device operates as follows:

The device enters action as the thermostat 37 signals to the switch 20 that the engine 1 is in steady thermal conditions. In view, for example, of a traffic light with a red (stop) signal, the progressive slow down of the car begins and there is a recovery of power obtained by 10 upon signalling from 32 which provides to close 21 and to activate 25a. 11 sends at the same time the signal of the value of the pressure existing at 10, which, processed at 25b and through 25c, adjusts by 29 the rate of flow of the pump 8, said regulation being intended in the sense that the rate of flow of 8 will be at a maximum when, at 10, the pressure will be at a preselected minimum, and the pump rate of flow will be zero when the maximum preselected pressure is attained at 10. Oil is drawn from a reservoir 9 by the pump 8 to be sent to the accumulator 10.

The closure of 21 causes also the valve 13 and the result is the cutting off of fuel from 14 during the entire deceleration time. Once the car is stationary and the gear shift lever 16 is neutral, 22 is shut if the consent 24 reaches it to signal a pressure of the accumulator 10 over the preselected minimum pressure and if electricity reaches 34. 34, once the preselected time has lapsed, actuates 13 and 26 simultaneously, 13 provides to cut off the dispensing of fuel from 14. 26a, actuated by 34, and 26b actuated by the pressure signal coming from 11 consent to 26c to adjust, via 29, the rate of flow of 8, so that 5 and 7 may drive the engine 1.

As the traffic light signals "go", the lever 16 generally passes from neutral to low gear. Said manoeuvre, with the consent of 24, closes the switch 23 and thus actuates 27a, which, together with 27b, adjusts, via 27c and with 29, the rate of flow of oil which flows from 10 to the pump motor 8 and contributes with 5 and 7 to the pickup of the car.

In the case of a sudden braking, the braking action actuates 28a so as to cause 28b to cut off 27 to insert, in its stead, 25 with the aid of 28c, thus passing from the auxiliary propulsion to an auxiliary braking action.

The main function of the timer 34 is to prevent the device of the invention from entering action when the traffic is smooth in the case in which a quick clutch shift is effected.

Figure 2:
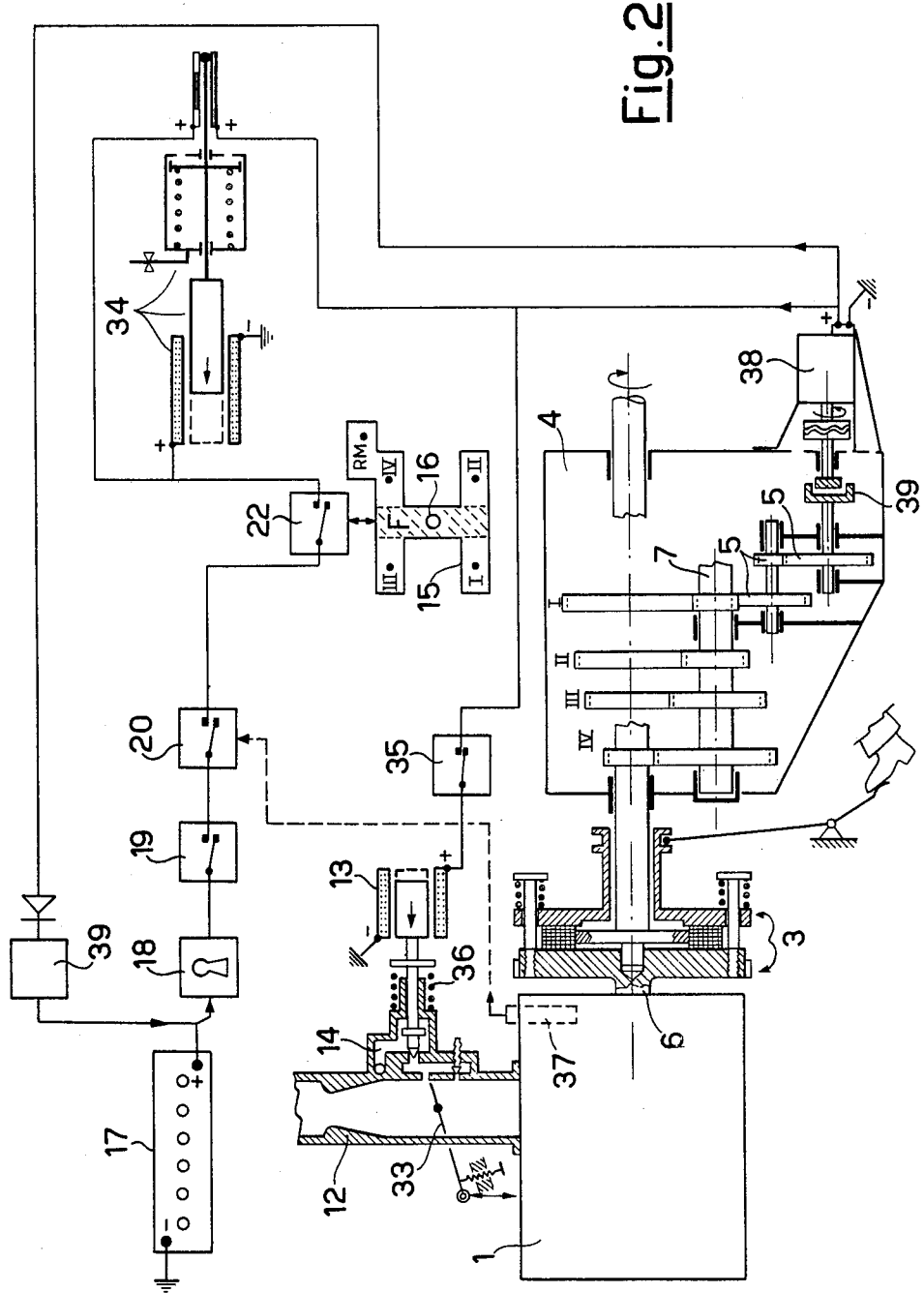
FIG. 2 shows a modification of the layout of FIG. 1.

FIG. 2 shows a modification as a diagram similar to FIG. 1, the same component parts having the same reference numerals, and in which the recovery of power is carried out by the alternator-motor 38 connected to the storage battery 17 through a rectifying regulator 39.

In this extremely simple case of optimum exploitation of an existing storage battery, an addition simplification of the circuit is achieved since there is no recovery of power in pickup condition of the engine, but the exploitation of power for driving the engine 1 during car stops is still achieved, so that all the regulating devices are dispensed with. It is to be noted that 8 is replaced by 38 and 10 and 9 are replaced by 17 while a centrifugal clutch 39 is additionally provided. This layout is of particular interest for run-about cars.

Figure 3:
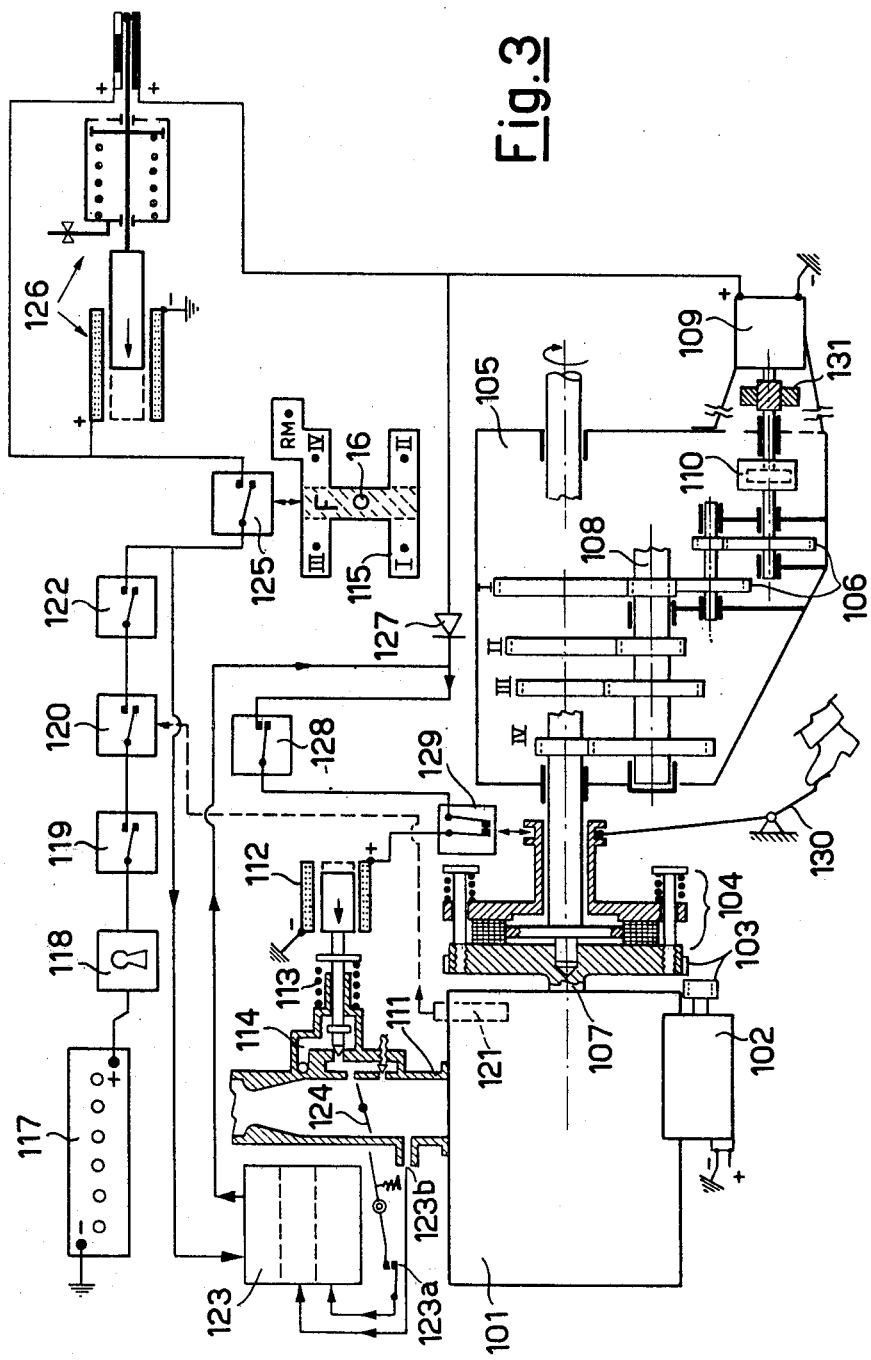
FIG. 3 shows an electromechanical device made according to the invention.

The embodiment shown in FIG. 3 relates to an electric and mechanical device to be applied as an integral part of an internal combustion engine having either a controlled or a spontaneous ignition system, said device permitting to suppress combustion when the latter is not necessary for propelling the vehicle concerned, that is, without any manipulations by the driver which are not the usual ones.

Devices are known which cut off the fuel intake as the accelerator pedal is released. Such devices have the considerable defect that they do not cut off the fuel intake when the vehicle is in the temporary car stops. Such temporary stops may represent up to the 30% of the total polluting emissions in typical traffic conditions in towns.

The device shown in FIG. 3 has, as its principal object, that of causing the fuel to be cut off also during the temporary stops and thus permits in a decisive manner to reduce the pollution level and, concurrently, also the fuel use up.

It has been surprisingly ascertained that the power which is required to keep a car engine idling during temporary stops can be drawn from the usual storage battery of the car without any appreciable overloading, and the electric and mechanical device to be described hereinafter relies on this fact in order that these objectives may be achieved.

The device will now be illustrated by a diagram reported in FIG. 3 which is given by way of example only, since modifications both of mechanical and electrical type can always be made without departing from the scope of this invention.

In FIG. 3, the numeral 101 indicates the internal combustion engine, 102 is the conventional starter with the starter ratchet and ring gear couple 103, 104 is the flywheel and clutch assembly, 105 is the gearbox, 106 is a first reducing gear in oil bath for driving the mainshaft 107 by the secondary shaft in permanent mesh, 109 is the electric motor for driving the engine through a second irreversible worm gearing 131 in oil bath, and 50 the free-wheel mechanism 110. Reference 111 is for the carburettor, 112 is the electromagnetic valve for cutting off fuel in the idling channel 114, 113 is the recoil spring. Reference 115 symbolically indicates the several positions taken by the gear shift lever 116. Reference 117 is the sotrage battery, 118 is the starting switch, 119 the main switch of the device, 120 is the consent switch for the attainment of the thermal steady conditions of the engine 101, as signalled by the thermostat 121; 122 is the consent switch for the sufficient conditions of charge of the battery, 123 is the deceleration sensor of the vehicle, comprising the accelerator pedal release contact 123a and the probe 123b for signalling a strong negative pressure downstream of the throttle 124 of the carburettor 111.

The reference numeral 125 indicates the consent switch of the gear in neutral condition, 126 is a timer, 127 a unidirectional conductor, 128 the manual switch for cutting off 112 for a possible hot engine start and, lastly, 129 is the switch which provides to cut off 112 whenever the clutch pedal is actuated with the usual linkages 130.

The operation of the device is as follows:

The device enters action when the thermostat 121 signals to the switch 120 that the engine 101 is in steady thermal conditions.

At the beginning of a usual slow-down with release of the accelerator pedal and the gear in mesh, the sensor 123, via 123a and 123b energizes 112, thus cutting off the fuel feed and 127 prevents the actuation of 109. The stop of the vehicle usually involves setting the speed shift lever to the neutral so that the switch 125 is closed and, after a short time preset by 126, simultaneously actuates 109 and 112. 190 drives at a low speed the engine 101 with the aid of 131, 110, 106 and 108, whereas 112 provides to command, or to confirm, the fuel cut off.

The main task of the timer 126 is that of preventing the device of the invention from entering action in the smooth road traffic conditions when gear shifts are quickly made, and, in addition, that of stopping the engine when the stop is extended beyond a second preset time limit. Both times can be adjusted at the driver's choice.

The function of the free-wheel mechanism 110 is to permit the rotation of the drive transmission system 107, 108, 106 while the reduction gear 131 is stationary when the motor 109 does not receive electricity.

It is to be noted, lastly, that such a device can be improved when the fuel cut off takes place through the thinning and cut off needle disclosed in a copending application in the name of the same Applicant. In such a case, it will become possible to prevent possible pick up lags of the engine as a result of the total emptying of fuel in the channels downstream of the cutoff seat of the magnetic valve 112.

We claim:

1. A pollution-preventing and power-recovery device for internal combustion engines comprising, in combination:
   (a) A power-storing device which accumulates mechanical power while the engine is in its normal running conditions during the run of the vehicle in smooth traffic conditions
   (b) Sensing means for detecting the conditions of engine idling during a forced stop of the car;
   (c) Means connected to said sensing means for cutting off the fuel intake to the engine;
   (d) Means connected to said sensing means for causing the actuation of said power-storing device as the idling run conditions of the engine are detected;
   (e) Timing means for rendering said pollution-preventing and power recovery device actuable for a preselected time at the user's choice; and
   (f) Means for resetting said fuel cut-off means and said actuation means, as defined at (c) and (d), as soon as the conditions of normal run of the vehicle on which said internal combustion engine is installed are resumed, said power-storing device comprising
   (g) A fuel actuated pump, a pressure accumulator for accumulating a working fluid for said pump, mechanical coupling means for disconnectably connecting said pump to said engine for driving same and being driven thereby according to a running mode of said engine, and a unit for regulating the rate of flow of fluid through said pump in accordance with the pressure of said working fluid in said accumulator.

2. Device according to claim 1, characterized in that said power-storing device consists of an electric motor, which receives electric power from the storage battery on board vehicle, a couple of irreversible gears, a freewheel mechanism and an additional reduction gear, the gear assembly being placed in an oil bath.

3. Device according to claim 1 or 2, further comprising sensing means responsive to the position, neutral or gear-mesh position of the gear shift lever of the vehicle on which the engine governed by the device is installed.

4. A pollution-preventing and power-recovery device for internal combustion engines comprising, in combination:
   (a) a power-storing device which accumulates mechanical power while the engine is in its normal running conditions during the run of the vehicle in smooth traffic conditions;
   (b) sensing means for detecting the conditions of engine idling during a forced stop of the car;
   (c) means connected to said sensing means for cutting off the fuel intake to the engine;
   (d) means connected to said sensing means for causing the actuation of said power-storing device as the idling run conditions of the engine are detected;
   (e) timing means for rendering said pollution-preventing and power recovery device actuable for a preselected time at the user's choice; and
   (f) means for resetting said means, as defined at (c) and (d), connected to said sensing means as soon as the conditions of normal run of the vehicle on which said internal combustion engine is installed are resumed; and wherein said power-storing device comprises
   a hydraulic or pneumatic pump, a pressure accumulator, a unit for adjusting the rate of flow of said pump, mechanical coupling means for disconnectably connecting said pump to said engine for driving same and being driven thereby according to running mode of said engine, and a unit for regulating the rate of flow of said pump so as to have such a rate of flow at a maximum when the pressure of the hydraulic working fluid is at a preselected minimum, and to have such rate of flow zeroed when said pressure is at a preselected maximum.

5. Device according to claim 4 characterized in that said sensing means are integrated by a rate of flow adjuster for said pump, a rotary speed adjuster for said engine when driven by said pump, and an adjuster for regulating the power dispensed by the engine when driven by said pump.

6. A pollution-preventing and power-recovery device for an internal combustion engine, said engine being coupled by a transmission to a load, said device comprising:
   means separate from said engine, for applying power to said engine;
   sensing means for detecting the condition of engine idling;
   means connected to said sensing means for cutting off the fuel intake to said engine;
   means connected to said sensing means for causing the actuation of said power means in accordance with the detection of an idling condition of said engine;
   means coupled between said sensing means and said power means for locking out said actuation of said power means during a shifting of gears in said transmission, and wherein said sensing means permits said fuel cutt-off means to be reset upon a normal run condition of said engine; and wherein said power means comprises a fluid actuated pump, a pressure accumulator for a working fluid of said pump, and a mechanical coupling means for disconnectably connecting said pump to said engine.

7. Device according to claim 1 characterized in that said sensing means are integrated by a rate of flow adjustive for said pump, a rotary speed adjuster for said engine when driven by said pump and an adjuster for regulating the power dispensed by the engine when driven by said pump.

* * * * *